UNITED STATES PATENT OFFICE.

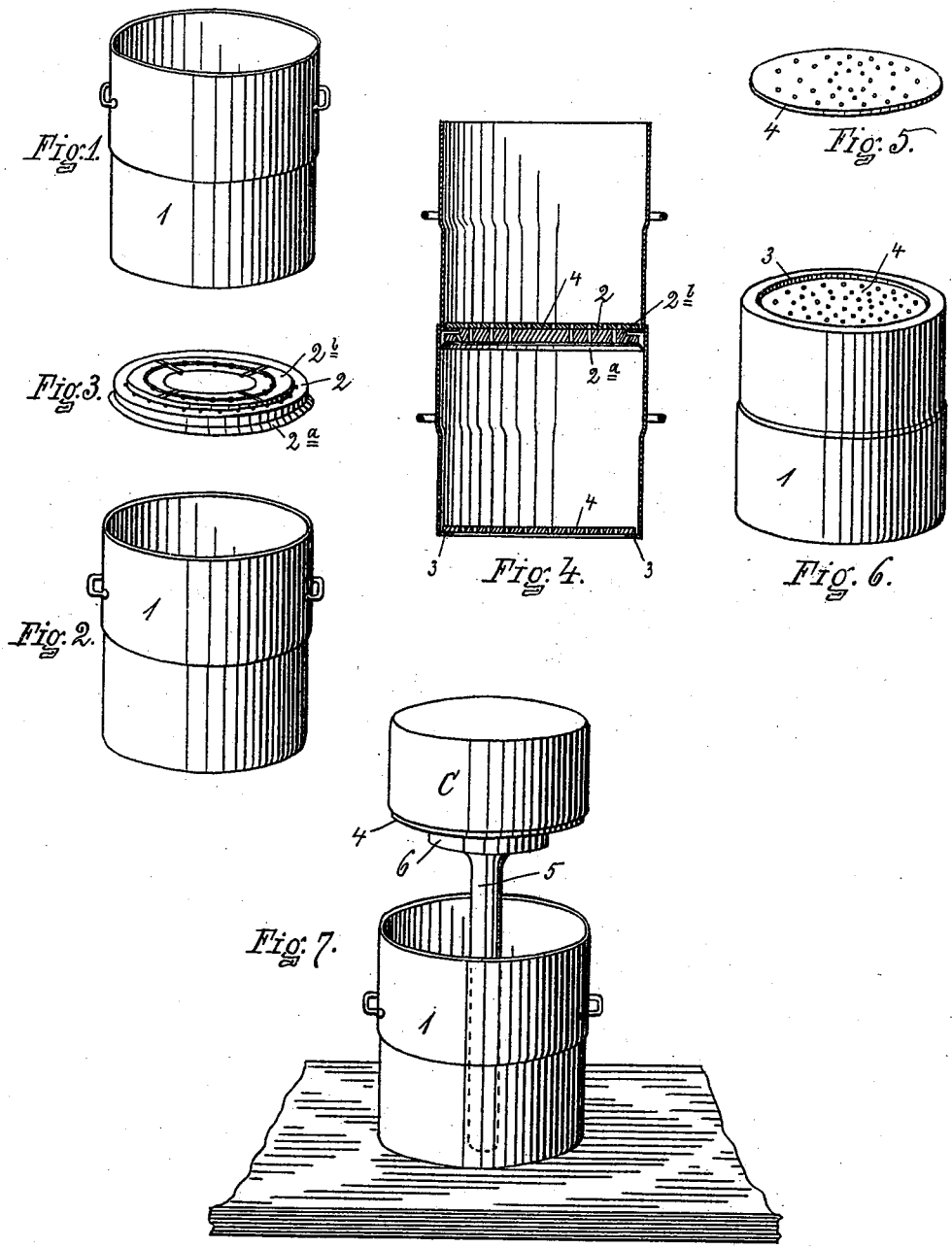

FRANK L. JONES, OF UTICA, NEW YORK.

CHEESE HOOP AND FOLLOWER.

SPECIFICATION forming part of Letters Patent No. 544,508, dated August 13, 1895.

Application filed November 22, 1894. Serial No. 529,570. (No model.)

*To all whom it may concern:*

Be it known that I, FRANK L. JONES, of Utica, in the county of Oneida and State of New York, have invented certain new and useful Improvements in Cheese Hoops and Followers; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

My invention relates to an improvement in cheese hoops and followers used in connection therewith.

In the drawings which accompany and form a part of this specification, Figure 1 shows a perspective view of a cheese-hoop embodying my improvements. Fig. 2 shows a second hoop of the same kind. Fig. 3 shows a follower, which is placed between the hoop in the press. Fig. 4 shows a vertical section of the two hoops and the follower when placed together in the first position of starting to press the cheese. Fig. 5 shows the removable perforated hoop bottom. Fig. 6 shows an inverted view of the hoop. Fig. 7 shows a cheese and the removable bottom removed from the hoop, with the means used for performing this operation.

Referring to the reference letters and figures in a more particular description, 1 indicates the hoop, which is what is known as a "gang-press" hoop, the upper portion of each hoop being adapted to receive the lower portion of the adjacent hoops. Between the hoops is introduced the follower 2, having perforations and grooves on its back side to allow the escape of the whey, and a flexible flange $2^a$ on the front side of its face to prevent the escape of the curd around the follower. The lower end of each hoop is provided with an inwardly-turned flange 3, adapted to support the perforated bottom 4, provided with perforations to allow the escape of whey while the cheese is being pressed. The back of the follower is provided with a raised central portion or offset, as shown at $2^b$, allowing the head of the follower to support the removable bottom 4 substantially over its entire surface.

In operation a series of hoops filled with curd and alternating with followers are placed together, substantially in the manner shown in Fig. 4, in a gang-press. After the pressing has been done the cheese C is removed from the hoop by setting the hoop containing the cheese on the post 5, provided with a plate-like top 6 and mounted on a suitable support, when, by forcing the hoop down, the bottom 4 and cheese are forced out and left standing on the support 5 with its plate 6. The cheese can then be removed from the removable bottom 4, which is replaced in the hoop for use again.

What I claim as new, and desire to secure by Letters Patent, is—

1. The combination of two or more hoops each having a removable bottom, an inwardly turned flange on its lower edge adapted to support the bottom, the lower portion of each hoop being reduced in diameter for some distance above the bottom to enter the upper end of the next adjacent hoop when placed in a gang, and a follower between the hoops, substantially as set forth.

2. The combination of two or more cheese hoops each having an inwardly turned flange on its bottom and reduced for some distance above the bottom to enter each other, a removable bottom for each hoop supported on the flange, and a follower having a projecting portion on its back adapted to support the central portion of the removable bottom, substantially as set forth.

3. The combination of a cheese hoop having an inwardly turned flange on its bottom, of a removable bottom supported thereon, a follower having a projecting portion on its back adapted to support the removable bottom, and a second hoop in which the follower operates substantially as set forth.

In witness whereof I have affixed my signature in presence of two witnesses.

FRANK L. JONES.

Witnesses:
 E. WILLARD JONES,
 PETER P. SMITH.